United States Patent [19]

Light et al.

[11] 3,865,708

[45] Feb. 11, 1975

[54] APPARATUS FOR MEASURING IONIC CONCENTRATION

[75] Inventors: Truman S. Light, Lexington; Kenneth S. Fletcher, III, Norfolk, both of Mass.

[73] Assignee: The Foxboro Company, Foxboro, Mass.

[22] Filed: Jan. 26, 1973

[21] Appl. No.: 327,215

Related U.S. Application Data

[63] Continuation of Ser. No. 887,092, Dec. 22, 1969, abandoned.

[52] U.S. Cl. .............................. 204/195 M, 204/1 T
[51] Int. Cl. ......................................... G01n 27/46
[58] Field of Search ....................... 204/1 T, 195 M

[56] References Cited
OTHER PUBLICATIONS
NBS Special Pub. 314, pp. 367 & 368, Nov. 1969.

Primary Examiner—T. Tung
Attorney, Agent, or Firm—Bryan, Parmelee, Johnson & Bollinger

[57] ABSTRACT

A system for measuring the ionic concentration or activity of a sample fluid by means of an ion selective membrane. The membrane forms part of a differential cell having two compartments separated by the membrane. In a preferred embodiment, the membrane is responsive to an ion different from the specific ion to be measured. Reagent containing ions to which the membrane is responsive is mixed with the sample fluid and reacted chemically therewith to reduce the concentration of the reagent ions by an amount proportional to the fluid sample ionic concentration. This mixed solution is passed through one compartment of the differential cell, and unmixed reagent is passed through the other compartment. The difference in concentration of the reagent ions on opposite sides of the membrane produces an electrical potential which is measured by reference electrodes to produce an indication of the ionic concentration of the fluid sample.

7 Claims, 3 Drawing Figures

PATENTED FEB 11 1975　　　　　　　3,865,708

INVENTORS
Truman S. Light
BY Kenneth S. Fletcher, III

Robertson, Bryan, Parmelee & Johnson
ATTORNEYS.

APPARATUS FOR MEASURING IONIC CONCENTRATION

This is a continuation, of application Ser. No. 887,092 filed Dec. 22, 1969, now abandoned.

This invention relates to electro-chemical measurement of ionic concentration or activity. More in detail, this invention relates to improved techniques for measuring the ionic concentration of a sample fluid by the use of an ion-sensitive membrane, particularly a membrane which is not responsive to the ion present in the sample fluid.

Electro-chemical techniques for the determination of ionic concentration have been known and used for years, for example, in measuring the hydrogen ion concentration or pH of a fluid. These techniques consist basically of using ion selective membranes or members, e.g., in the form of electrodes placed in a test solution, and measuring the electrical potential (emf) produced across the membrane. As explained in the prior art literature, such as U.S. Pat. No. 3,431,182, the emf produced across the ion sensitive membrane is a function of the ion concentration of the solution.

Electro-chemical techniques have heretofore been limited by the availability of ion selective membranes suitable for a particular ion to be analyzed. The present invention makes it possible to use an ion sensitive membrane for the analysis of an ion to which it is not directly responsive. In addition to broadening the usefulness of presently available membranes, this invention provides superior measurement accuracy through the application of differential measurement techniques.

The invention concerns an ionic concentration analyzer which in one embodiment utilizes as its detector a differential cell with an ion selective membrane forming part of a wall dividing the cell into two compartments. A reagent is provided containing ions to which the ion sensitive membrane is responsive and which will produce a rapid, reproducible chemical reaction with the ions of the sample fluid. In the presently preferred embodiment, such reagent is split into two streams. One stream flows directly into one compartment of the differential analyzer cell. The second stream is mixed in a predetermined ratio with the sample fluid and thereafter passes into the other compartment in the cell. Reference electrodes located in each compartment of the differential cell cooperate to produce a potential providing a measure of the ionic concentration of the sample fluid.

In more detail, if the reaction between the reagent and the sample fluid is both rapid and reproducible, a predictable proportion of the ions from the sample fluid will combine with a predictable proportion of the ions from the reagent, leaving a predictable proportion of the ions of the reagent uncombined with those of the sample fluid. Thus there will be different levels of concentration of reagent ions on opposite sides of the ion-sensitive membrane. This difference in concentration produces across the ion-sensitive membrane a voltage which is a function of the concentration of ions in the sample fluid.

For a fuller understanding of the nature and objects of the present invention, reference may be made to the following detailed description considered together with the accompanying drawings in which.

Figure 1:
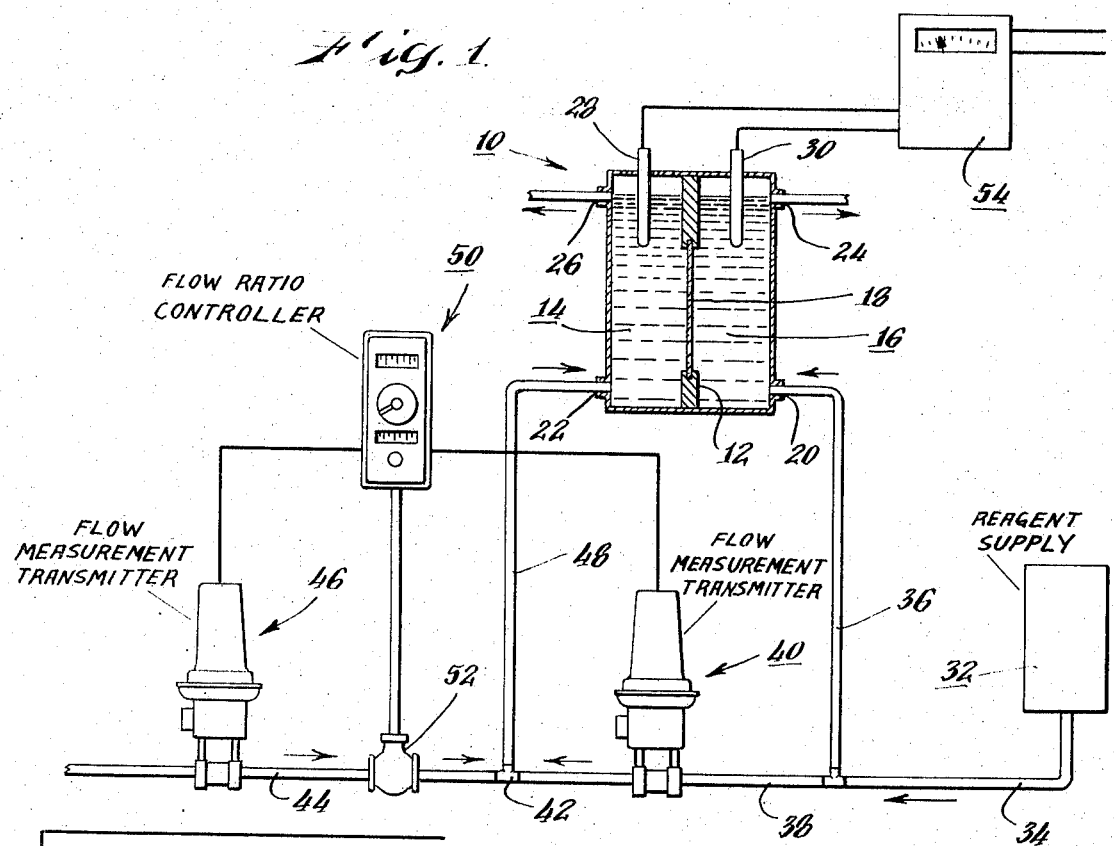
FIG. 1 is a schematic view of a differential cell analyzer in accordance with this invention.

Referring now to FIG. 1, the invention will be illustrated herein for use in measuring the concentration of aluminum ions. Examples of industrial situations where the analysis of the concentration of aluminum ions in solution is needed include Bayer liquor solutions and sodium hydroxide solutions used for stripping aluminum. At present there is no commercially available ion-selective membrane or material suited for measuring the concentration of aluminum ions. The present invention makes this measurement by using a membrane responsive to a different ion which in the illustrated embodiment is the fluoride ion.

Referring now to the drawing, there is provided a differential cell 10 comprising outer walls and a central partition 12 dividing the cell into two compartments 14 and 16. Forming part of the dividing partition is an ion-selective membrane 18 responsive to fluoride ions. Liquid enters the two compartments of the differential cell at respective ports 20 and 22, and is discharged at ports 24 and 26, respectively. Reference electrodes 28 and 30 are positioned in the two compartments of the cell to measure the voltage produced by the ion-selective membrane when there is a difference in fluoride ion concentration in the compartments.

Reagent from a supply 32 passes through conduit 34 and is split into two streams. One stream is directed through a channel illustrated as a pipe 36 connecting to differential cell 10 at port 20; the reagent passes through the cell and out discharge port 24 to waste. The second stream 38 passes by a flow measurement transmitter 40 (such as a conventional differential-pressure transmitter) and is mixed at junction 42 with the sample stream 44 the flow rate of which is measured by a second flow transmitter 46. The mixture passes via conduit 48 to the differential cell, entering through port 22 and exiting through port 26 to waste. The ratio of sample flow to reagent flow is controlled by a conventional flow ratio controller 50 responsive to the signals received from flow transmitters 40 and 46, and which serves in the usual way to maintain the ratio at a predetermined value by suitable adjustment of a valve 52.

The voltage developed between the electrodes 28 and 30 is sensed by a known signal processor 54, basically comprising a sensitive amplifier adapted to provide an output signal for operating devices such as a chart recorder and/or a process controller (not shown). Such controller may, for example, be arranged to operate a process valve to adjust the aluminum ion concentration so as to maintain the concentration at a predetermined set point.

If the membrane 18 is of the high electrical impedance type, it may be desirable to insure that the stream passing through pipe 36 also presents a high electrical impedance, to prevent establishing an effective short circuit to the electrodes. For example, pipe 36 can be a capillary, having extremely small cross-section, or the reagent stream can be passed through a drip arrangement, where the droplets are effectively insulated by air. Other suitable isolation techniques will be apparent to those skilled in this art.

A typical composition of the fluoride reagent 32 might be 0.05M sodium fluoride in a high ionic strength buffer consisting of 0.75M sodium acetate, 0.25M acetic acid and 1.0M sodium chloride, pH 5.0. Typical ion-sensitive membranes responsive to the fluoride ions of the reagent can be formed in various ways, for example from trifluoride of lanthanum, or other insoluble fluorides as mentioned in U.S. Pat. No. 3,431,182.

The method of the preferred embodiment discussed above is based on a strong complex formed between the aluminum and fluoride ions which combine in the following manner:

$$Al^{+++} + nF^- = AlF_n^{+(3-n)}$$

Because this reaction is rapid and reproducible, a predictable proportion of ions from the sample fluid will combine with a predictable proportion of the fluoride ions of the reagent. Such reacted fluoride ions are thus effectively eliminated from the mixture, insofar as the ion-sensitive membrane 18 is concerned. Because this membrane produces an emf which is a function of the difference in the ionic concentration on opposite sides of the cell 10, this emf will necessarily be a function of the amount of "eliminated" ions, and thus a function of the concentration of aluminum ions in the sample fluid.

To begin operation, the apparatus first is zeroed so that the voltage ($\Delta E$) sensed by the signal processor 54 represents only the difference in fluoride ion concentration between the two streams passing through the differential cell 10. Zero adjustment is accomplished by shutting off the sample stream and permitting the reagent to flow through both compartments of the differential cell, and adjusting the signal processor to provide a zero-level signal. (Note: the zero-level signal may of course be a "live" zero.)

Once the apparatus has been properly zeroed, the span may be set to full scale or a calibrated point on the scale by activating the flow ratio controller 50 to maintain the predetermined ratio between the (standard) sample and reagent flow rates. The fluoride ion concentration on opposite sides of the differential cell thus is unbalanced and a potential will be developed across the ion selective membrane. This potential $\Delta E$ represents the concentration of aluminum ions.

The relationship between the emf observed by signal processor 54, $\Delta E$ (in millivolts), and the concentration of aluminum ions $C_{Al}$, is given by the following equations:

$$C_{Al} = KX$$

where
$X = (Y-1-(\Delta R/R_o))/Y\Delta R$
$K = R_o C_F/\bar{n}$
$Y = 10^{(\Delta E/0.1984T)}$ $R_o$ equals the flow rate (e.g., in milliliters per minute) of starting fluoride solution, $\Delta R$ equals the flow rate (in the same units) of aluminum solution added, $C_F$ equals the concentration of the starting fluoride solution in moles per liter, $\bar{n}$ equals the average number of fluorides bound to aluminum, $AlF_{\bar{n}}$ and T equals the absolute temperature in degrees Kelvin. It will be noted that in the above equations the only unknown is $\Delta E$. By measuring $\Delta E$ the concentration of the ions can be calculated, and thus the instrument system can readily be calibrated or calculated so that each output voltage represents a corresponding concentration.

While the present example has been limited to the analysis of aluminum ions, it should be apparent that there are many other applications of the invention.

Below are described briefly other potential applications of the method and apparatus of the present invention.

Example 1 — Analysis of Cyanide

Although an ion-sensitive membrane is available for the direct measurement of the cyanide ion, it has certain limitations. A fluoride sensitive membrane could be utilized for measuring the concentration of cyanide ions if the reagent solution were aluminum fluoride.

Example 2 — Analysis for Sulphate

Using a solid lead-sensitive membrane and a reagent solution including lead ions (possibly a lead nitrate solution), formation of insoluble lead sulphate would permit correlation of a measured $\Delta E$ with the concentration of the sulphate ions.

Example 3 — Analysis for Phosphate

Using a precipitation method, several ion-selective electrode membranes may be utilized. The solid membrane for silver ion could be used if the reagent solution were ammonical silver nitrate. The liquid ion exchange membrane for calcium could be used if the reagent solution were alkaline calcium ion.

Example 4 — Analysis for Sulfide

The sulfide electrode measures only the concentration of the free sulfide ions. In certain cases, such as in the paper pulp industry, it is of interest to measure not only the inorganic (free) sulfides but also the organic sulfides such as methyl sulfides and the mercaptans which have very little free sulfide ions. If the reagent solution employed for the differential cell analyzer is ammonical silver nitrate, then concentration of total sulfide may be obtained as a measure of the loss of silver ion.

Figure 2:
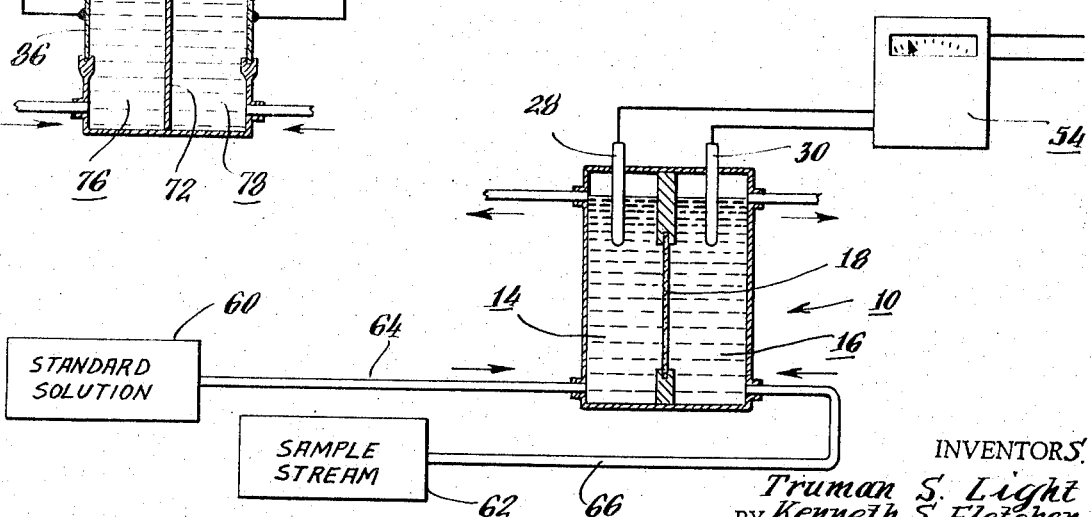
FIG. 2 shows another measurement system making use of the differential cell of FIG. 1.

Referring now to FIG. 2, the differential cell 10 can be utilized for making direct comparisons between the concentrations of a standard solution source 60 and a sample stream generally indicated at 62. Fluid from these sources flows through respective conduits 64, 66 to corresponding compartments 14, 16 of the differential cell. In this case, the membrane 18 is responsive to the specific ion of the sample fluid. As before, the voltage developed across the membrane 18 is sensed by a pair of identical reference electrodes 28, 30 and directed to the signal processor 54 in order to produce a corresponding signal for a process controller or the like.

The arrangement of FIG. 2 may for example be used in measuring the acid concentration of a sample stream. Thus the membrane 18 may be a pH glass membrane, and the reference electrodes may be of the type sold commercially by The Foxboro Company, identified as Double Junction Reference Electrode, Part No. Q0106AA. It may particularly be noted that in the arrangement of FIG. 2 the two solutions do not mix, and their flow rates need not be critically controlled since flow rate is not a quantitative variable. This differential measurement technique provides high accuracy relative to other conventional techniques.

Figure 3:
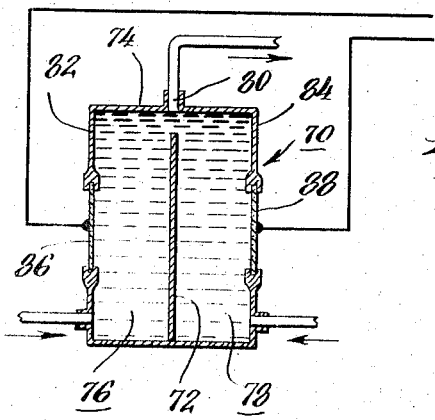
FIG. 3 shows another differential cell construction.

The configuration of the differential cell may be altered from that shown in FIGS. 1 and 2. Referring to FIG. 3, a differential cell 70 may be used having a solid (non-membrane) central portion 72 interrupted near one end 74 to provide contact between the fluids in the two compartments 76, 78 in the region adjacent the common drain port 80. This junction region is so arranged as to provide laminar mixing adjacent the drain, and various geometrical configurations can be used for this purpose. The outer walls 82, 84 of the compartments 76, 78 incorporate identical ion-selective membranes 86, 88.

The differential cell of FIG. 3 may be incorporated in the FIG. 2 arrangement, for example to determine the concentration of chloride in a sample stream, without using reference electrodes. The membranes thus may be solid-backed chloride-ion-sensitive membranes of known construction. With this arrangement, a potential is developed between the two membranes corresponding to the difference in the ionic concentration of the sample stream and the standard solution. This potential is directed to a signal processor as described above.

It may be noted that the two membranes 86, 88 together serve the same basic function as the single membrane 18 used in the preceding examples. For that reason, the term "membrane system" is used in the claims to describe generically the membrane aspects of this invention, and it is to be understood that such term embraces other membrane arrangements producing the same functional results.

We claim:

1. Apparatus for making on-stream measurements of the ionic concentration of a sample fluid by analyzing cell structure including an ion-selective membrane system which is non-responsive to the particular ion to be measured in said fluid sample, said cell structure being formed to provide two fluid regions each coupled to a corresponding element of said membrane system, and means connected to said fluid regions to sense electrical potential therebetween;

said apparatus comprising:

first means for furnishing a flow of said sample fluid;

second means for providing a supply of reagent containing an ion to which said membrane system is sensitive and which when mixed with said sample fluid reacts therewith to reduce the concentration of said reagent ion in correspondence to the concentration of said particular ion;

mixing means coupled to said first and second means to receive said flow of sample fluid and a corresponding flow of said reagent and to develop a mixture thereof in a specific controllable proportion;

third means connecting said mixing means to said cell structure to supply said mixture to one of said fluid regions; and fourth means connected to said cell structure to supply a flow of said reagent to the other of said fluid regions, whereby to develop an electrical potential between said two fluid regions indicative of the concentration of said particular ion in said sample fluid.

2. Apparatus as claimed in claim 1, wherein said third and fourth means include means to pass said mixture and said reagent in respective continuous streams through said fluid regions.

3. Apparatus as claimed in claim 2, wherein said mixing means includes means to combine a flowing stream of said reagent with a flowing stream of said sample fluid.

4. Apparatus as claimed in claim 3, wherein said mixing means includes means to measure the flow rates of said flowing streams of reagent and said fluid sample; and flow ratio control means responsive to said measured flow rates and operable to maintain the ratio thereof at a predetermined fixed value.

5. Apparatus as claimed in claim 1, wherein said cell structure comprises a differential cell having means defining two fluid compartments with a partition therebetween.

6. Apparatus as claimed in claim 5, wherein said membrane system comprises a membrane forming part of said partition to contact fluids in said two compartments; and electrodes in said compartments to contact the respective fluids to develop an output signal responsive to the potential produced across said membrane in correspondence with the difference in ionic concentration.

7. Apparatus as claimed in claim 5, wherein said compartments include outer walls, said membrane system including first and second matching membranes each mounted in an outer wall of a respective compartment to contact the fluid in that compartment; and means connecting the outer sides of said membranes to a voltage measuring device.

* * * * *